United States Patent [19]
Zartman

[11] Patent Number: 5,967,091
[45] Date of Patent: Oct. 19, 1999

[54] FREE HANGING ANIMAL STALL

[76] Inventor: Thomas L. Zartman, 820 Hilltop Rd., Ephrata, Pa. 17522

[21] Appl. No.: 09/120,438

[22] Filed: Jul. 22, 1998

[51] Int. Cl.⁶ .................................................. A01K 1/00
[52] U.S. Cl. ........................... 119/522; 119/523; 119/516
[58] Field of Search .................................. 119/522, 523, 119/516, 520, 519, 14.03

[56] References Cited

U.S. PATENT DOCUMENTS

| | | | |
|---|---|---|---|
| 13,312 | 7/1855 | Jenne | 119/523 |
| 755,200 | 3/1904 | Werner | 119/523 |
| 889,735 | 6/1908 | Underhill | 119/516 |
| 1,797,159 | 3/1931 | Shafer | 119/523 |
| 2,408,533 | 10/1946 | Russell | 119/523 |
| 3,421,478 | 1/1969 | Warmerdam | 119/523 |
| 3,726,257 | 4/1973 | Andersen | 119/523 |
| 3,734,059 | 5/1973 | Rodrigues | 119/520 |

*Primary Examiner*—Michael J. Carone
*Assistant Examiner*—Judith A. Nelson
*Attorney, Agent, or Firm*—Martin Fruitman

[57] ABSTRACT

The disclosure is for a free hanging animal stall. The stall sides are curved pipes forming a loop-like barrier hanging above floor level with no support from the floor or ceiling. The stall is supported by several chains hanging from the header board, and chains are also angled from the head end of the stall so that the stall is urged toward the header board at the head of the stall. The chains permit simple adjustment of the height of the stall sides above the floor and the structure also prevents the animal from being trapped under the sides because, if the animal is under a stall side, the sides are simply temporarily tilted up by an animal as it stands up.

7 Claims, 1 Drawing Sheet

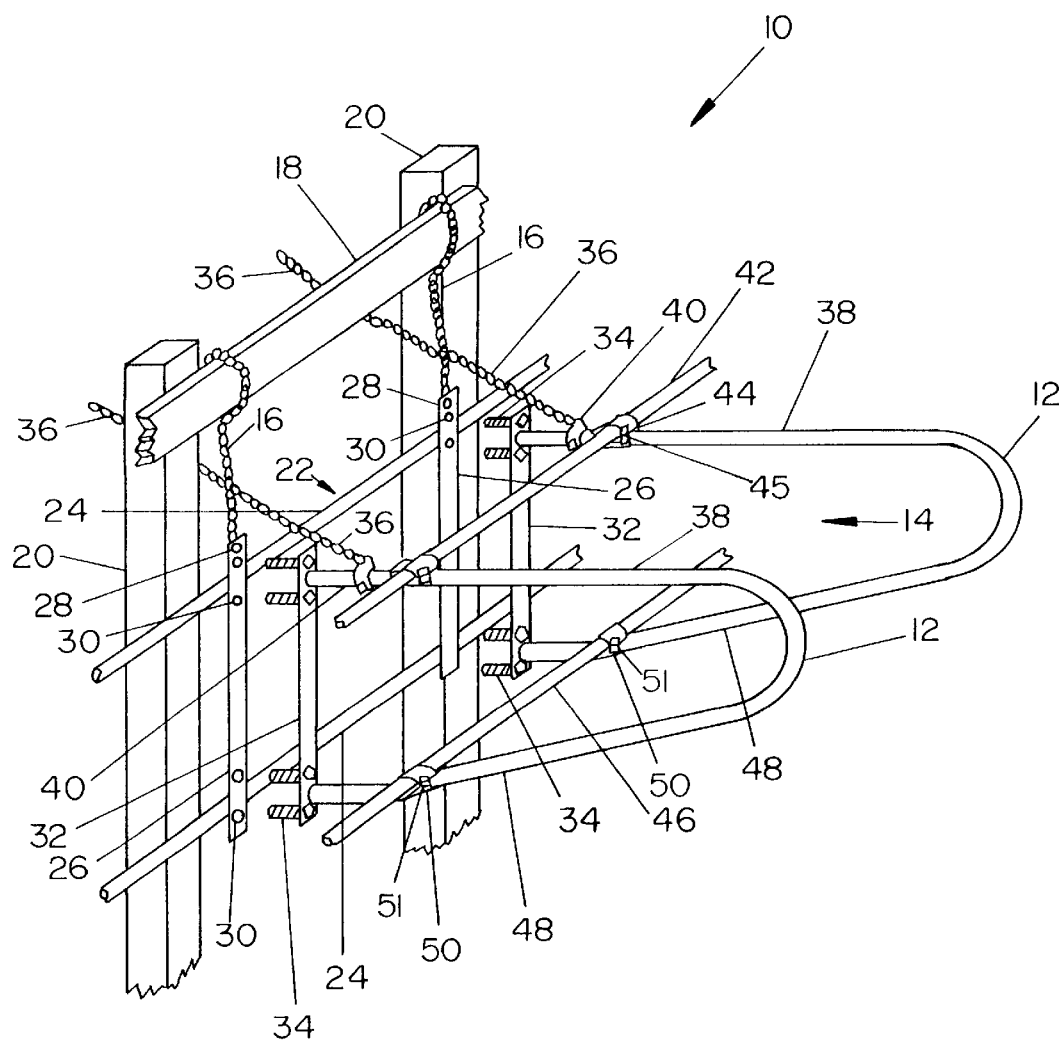

FREE HANGING ANIMAL STALL

BACKGROUND OF THE INVENTION

This invention deals generally with animal stalls and more specifically with an adjustable height stall which is constructed to prevent an animal from being trapped when it has part of its body under a stall partition.

Although the oldest type of cattle stall is the conventional style with vertical wood sides, there are several newer designs which use configurations of pipes as side barriers. The stalls constructed from pipes are particularly convenient and economical because they require little maintenance, and such stalls can be largely preassembled, so that it is only necessary to install the preassembled unit in a location within a barn.

However, the pipe barriers do have some problems. In order to facilitate maintenance of the stall, such pipe based stalls are usually built so that they have very few, or even no, supports extending to the stall floor. One such design is shown in U.S. Pat. No. 3,726,257 by Anderson, which discloses a stall side constructed from a pipe loop supported from a single vertical pole located toward the head end of the stall, the end at which the animal's head is normally located. However, a large open space below the side barrier of a stall whose lowest structure is located above the floor can actually trap an animal in a manner which prevents it from standing up. If, for instance, a cow which is lying in the stall becomes situated so that its head or body is below a horizontal member of a stall side, the cow will not be able to stand up.

It would be beneficial to have a stall structure which is built from pipes to reduce its weight and maintenance and which has clear space below the stall side barrier, but nevertheless prevents an animal from being trapped beneath the stall side barrier.

SUMMARY OF THE INVENTION

The present invention is an animal stall assembly which has free hanging side partitions. The partitions are curved pipes forming a loop-like barrier hanging above floor level with no support from the floor or the ceiling. The only supports for the stall assembly are several chains hanging from the header board at the head of the stall, and chains angled from the head end of the stall are used so that the stall is urged toward the header board. It is also advantageous, and practical because of the light weight, to construct the stall assembly in multiple units, thus permitting simultaneous installation of several stalls.

The chain supports permit simple adjustment of the height of the stall sides above the floor, so that the stall can easily be accommodated to different size animals by simply shortening or lengthening the chains. Accessory devices, such as training rails and brisket rails, can also not only be attached to the pipes of the stall sides, but they can also be adjusted by sliding them along the pipes and locking them in place with clamps.

The stall assembly of the preferred embodiment of the invention is constructed with its side barriers formed as approximately "U" shaped pipe loops. Both ends of each pipe loop are attached to a single flat end bar which spans the space between the ends to close the loop. Each end bar also has several holes for bolts which are used to attach the loop sides to the rest of the stall assembly. The pipe loops are each attached to a base frame which is a simple rectangle constructed of two separated horizontal base pipes attached to two separated vertical flat base bars. The vertical base bars have bolt holes in a pattern which matches those on the end bars of the side barrier loops, and the loops are attached to the base frame so that the loops and the base frame are oriented in approximately vertical planes.

The base bars are separated by a dimension which determines the width of the stall, and the base pipes can extend beyond the intersections with the base bars and serve as the means to interconnect multiple stalls into a single stall assembly. It should be noted that each side barrier loop can serve as the divider between two stalls, so that a stall assembly for multiple stalls only needs one more side barrier than there are stalls.

The stall assembly with one or more stalls is hung with chains from a header board which is mounted on support posts at the head ends of the stalls, the ends at which the animal's heads are usually located. The header board is a simple horizontal board or beam attached high on two or more support posts, which are either structural support members of the building or free standing vertical posts. Chains capable of supporting the stall assembly are attached to or wrapped around the header board, and the other ends of the chains are attached to holes in one end of the base bar. The length of these vertical hanging chains determines the height above the floor at which the stall assembly is supported.

However, with the chains attached to only one end of the stall assembly and the center of gravity of the stall assembly far removed from the chain supported end, without additional support, the far end of the stall assembly would tip down to the ground. To prevent this, chains oriented at an angle to the vertical are installed between the stall assembly and a structural support, such as a building wall, the header board, or the support posts, at the head end of the stall assembly. These angle chains are attached to the upper pipes of the side barrier loops at a significant distance away from the base frame, and since they counteract the torque from the offset weight of the stall frame they can easily be adjusted to hold the stall assembly in a horizontal orientation.

The present invention also includes two accessory devices which can be attached to the stall assembly. A training rail, a simple length of straight pipe, can be installed across the stall by attachment to the upper pipes of the loops of the stall with releasable clamps. Such an arrangement permits the training rail to be moved closer to or farther from the head end of the stall. This forces a cow to move away from the head end of the stall when it first stands up.

An adjustable brisket rail, also a simple length of straight pipe, can also be installed across the lower portion of the stall by attaching it to the lower part of the barrier loops with releasable clamps. The brisket rail is then also adjustable to different locations along the length of the stall by merely loosening the clamps and sliding them along the pipes of the loops. This brisket rail keeps the cow far enough back in the stall so that it can move forward in the stall as it stands up. Without the brisket rail the cow would not be able to stand up if it was too close to the wall at the head end of the stall.

An additional benefit of the training rail and the brisket rail of the invention is that, in a multiple stall assembly, they can both be extended across and clamped to all the stalls, and thereby they add considerable strength and rigidity to the stall assembly.

The present invention thereby supplies a versatile, light weight, low maintenance, stall assembly which can be used to furnish one or more stalls, and can also be fully assembled before installation. Furthermore, the installation is quite simple, merely the hanging of several chains, and can be accomplished without skilled labor.

BRIEF DESCRIPTION OF THE DRAWING

The FIGURE is a perspective view of the preferred embodiment of the invention.

DETAILED DESCRIPTION OF THE INVENTION

The FIGURE is a perspective view of the preferred embodiment of incompletely assembled stall assembly 10 of the invention in which loops 12 form the side barriers of stall 14. Stall assembly 10 is supported off the floor (not shown) by suspension chains 16 which are wrapped around as shown, or otherwise attached to, header board 18, which is located above the highest portion of stall assembly 10. Header board 18 can be attached to a building wall (not shown), or, as shown in the FIGURE, header board 18 can be attached to free standing vertical posts 20.

Suspension chains 16 are attached to stall assembly 10 at base frame 22, which is constructed as a simple rectangle with horizontal base pipes 24 attached to vertical base bars 26. Holes 28 at the top of base bars 26 are used as the connection points for suspension chains 16. Attachment holes 30 are also located on base bars 26 so that loops 12 can be attached to base frame 22.

Loops 12 are each essentially a pipe loop formed into an approximate "U" with end bar 32 attached to both ends of the pipe to close the loop. End bars 32 are constructed with several holes through which bolts 34 are inserted. Bolts 34 are also inserted through attachment holes 30 in base bars 26 as a means of attaching individual loops 12 to base frame 22 to form the basic structure of stall assembly 10.

As can be seen from the FIGURE, the structure of stall assembly 10 is such that suspension chains 16 would be insufficient to prevent stall assembly 10 from tipping down to the ground. To counteract the torque around base frame 22, balance chains 36 are attached to upper pipes 38 of loops 12 at adjustable clamps 40. Clamps 40 are located at a point on upper pipes 38 which is sufficiently removed from base frame 22 to support loops 12 so that upper pipes 38 are approximately horizontal. Although balance chains 36 are shown oriented at an angle to the vertical, as they would be when their remote ends are attached to a building wall (not shown), header board 18 or vertical posts such as posts 20, it should be appreciated that balance chains 36 can also be attached to roof beams of the building in which they are located, and would then be oriented vertically.

Stall assembly 10 includes adjustable training rail 42 which is attached to upper pipes 38 by releasable clamps 44 tightened by bolts 45. Merely loosening clamps 44 permits moving training rail 42 along upper pipes 38 to any desired location. Similarly brisket rail 46 is attached to lower pipes 48 of loops 12 by releasable clamps 50 tightened by bolts 51. Brisket bar 46 can therefore be located anywhere along the length of stall 14 by sliding it along lower pipes 48.

All the horizontal cross members of stall assembly 10, base pipes 24, training rail 42, and brisket rail 46, are shown in the FIGURE with discontinued ends because they are the parts upon which multiple stall assemblies are based. When those horizontal cross members are extended in either direction, it is only necessary to add base bars 26, suspension chains 16, and loops 12 to attach additional stalls 14 to stall assembly 10. It is quite practical to construct stall assemblies including up to six stalls side by side, and even with that many stalls, it has been found that only two balance chains are needed for the entire assembly.

Stall assembly 10, as described above, is not only fully adjustable in its height above the stall floor by merely shortening or lengthening the chains, but it has another particular advantage over the prior art stalls constructed of pipes. Even though it may be possible for an animal to be situated on the ground below loops 12, stall assembly 10 is not restrained from moving upward. Therefore, when an animal attempts to stand up, rather than being trapped by a stall barrier above it, the stall barrier is merely temporarily lifted up as the animal stands up, and as the animal moves away, the stall moves back to its original position.

The preferred embodiment of the invention is constructed with the width of stall 14, the distance between loops 12, being four feet, and the length of stall 14, the length of loops 12, being six feet. Loops 12 are formed from 2⅜ inch outer diameter aluminum pipe with 12 gauge wall, and base bars 24, training rail 42, and brisket rail 46 are all constructed from 1.9 inch outer diameter aluminum pipe with 10 gauge wall.

The present invention therefore furnishes an easily installed, low maintenance stall assembly which does not endanger the animals kept within it.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, fastening means other than bolts could be used to secure loops 12 to base frame 22, or base bars 26 and end bars 32 could be combined into a single piece. Furthermore, balance chains 36 could be oriented vertically if appropriate support structure was available above the stall assembly.

What is claimed as new and for which Letters Patent of the United States are desired to be secured is:

1. A stall assembly for animals comprising:

a frame oriented in a vertical plane;

at least two side barriers comprising pipes formed into loops which have an upper pipe and a lower pipe, with the loops attached to the frame so that the loops are oriented in parallel vertical planes and are separated by a distance which determines the width of the stall;

at least two suspension chains, each chain with one end attached to the frame and with the other end attached to a first support member located above the frame; and at least two balance chains each chain with one end attached to a loop at a location remote from the frame and with the other end attached to a second support member which is located in a horizontal plane located above the upper pipes of the loops, wherein the suspension chains and the balance chains support the frame and the attached loops.

2. The stall assembly of claim 1 wherein the suspension chains and the balance chains may be lengthened and shortened to adjust the height at which the stall is supported.

3. The stall assembly of claim 1 wherein the frame comprises two horizontal pipes and two attached vertical bars, with the vertical bars including holes by which the loops can be bolted to the frame.

4. The stall assembly of claim 1 wherein the first support member to which the other ends of the suspension chains are attached is a header board which is attached to at least two posts.

5. The stall assembly of claim 1 wherein the second support member to which the other ends of the balance chains are attached is located on the opposite side of the frame from the loops.

6. The stall assembly of claim 1 further including a training rail oriented transverse to the loops, located across the distance separating the loops, and attached to the upper pipes of the loops with releasable clamps.

7. The stall assembly of claim 1 further including a brisket rail oriented transverse to the loops, located across the distance separating the loops, and attached to the lower pipes of the loops with releasable clamps.

\* \* \* \* \*